United States Patent [19]

Tanaka et al.

[11] 4,304,460
[45] Dec. 8, 1981

[54] OPTICAL SWITCHING DEVICE

[75] Inventors: Tsutomu Tanaka, Nishinomiya; Yoshinobu Tsujimoto, Kashihara; Hiroyuki Serizawa, Hirakata; Katsuji Hattori, Takarazuka, all of Japan

[73] Assignee: Matsushita Electric Industrial Co., Ltd., Kadoma, Japan

[21] Appl. No.: 18,243

[22] Filed: Mar. 7, 1979

[30] Foreign Application Priority Data

| Mar. 10, 1978 | [JP] | Japan | 53/028150 |
| Sep. 1, 1978 | [JP] | Japan | 53/107903 |
| Sep. 20, 1978 | [JP] | Japan | 53/116427 |
| Sep. 20, 1978 | [JP] | Japan | 53/116428 |
| Dec. 25, 1978 | [JP] | Japan | 53/165665 |

[51] Int. Cl.³ .................. G02B 5/16; G02F 1/00
[52] U.S. Cl. .................... 350/96.16; 350/96.18; 350/96.20
[58] Field of Search ............... 350/96.15, 96.16, 96.18, 350/96.19, 96.20

[56] References Cited

U.S. PATENT DOCUMENTS

| 3,886,544 | 5/1975 | Narodny | 350/96.15 |
| 3,937,557 | 2/1976 | Milton | 350/96.16 |
| 4,111,524 | 9/1978 | Tomlinson | 350/96.16 |
| 4,153,330 | 5/1979 | Tomlinson | 350/96.19 |
| 4,208,094 | 6/1980 | Tomlinson et al. | 350/96.18 |

FOREIGN PATENT DOCUMENTS 2745940 4/1978 Fed. Rep. of Germany ... 350/96.18

OTHER PUBLICATIONS

M. Nunoshita et al., "Optical Switch for Multimode Optical Fiber System" Optics Letts. vol. 4, No. 1, Jan. 1979.
Kaede et al., "Low-Loss Micro-Optic Switches" Proceedings of Optical Quantum Electronics QQE77-85, pp. 109–114, Dec. 1977.
Ohchi et al., "An Optimum Point of Magnetic Force Appl. for Optical Fiber Switch" Proc. of Optical Quantum Electronics QQE77-118, pp. 69–75, Mar. 1978.
M. Nunoshita et al., "Optical Switch for Multimode Optical Fiber" Proc. of Optical Quantum Electronics, QQE77-119, pp. 77–82, Mar. 1978.
W. Tomlinson et al., "Multiposition Optical-fibre Switch" *Electronics Letts.* vol. 15, No. 6, pp. 192–194, Mar. 1979.

*Primary Examiner*—Stewart J. Levy
*Attorney, Agent, or Firm*—Cushman, Darby & Cushman

[57] ABSTRACT

Respective end faces of two or more optical waveguides (23 to 29) are connected on one end face of a focussing rod lens (20) and a reflection means (21) having a reflection plane tilted with a specified angle ($\alpha$) to the normal plane to the lens axis is disposed behind the other end face of the focussing rod lens (20) and angle of reflection plane of the reflection means (21) is varied by rotating the reflection means (21) around the lens axis (203) or by means of a piezo-electric driving device (30), thereby attaining selective switching of the waveguides (from 23 to selected one of 24 to 29) or varying the amount of rays to be transmitted through the waveguides (23 & 24 of FIG. 4), or thereby modulating the rays. By utilizing a semitransparent filter forming another tilted reflection plane, the amount of attenuation for different wavelength or connection of the waveguides are controlled separately.

17 Claims, 11 Drawing Figures

OPTICAL SWITCHING DEVICE

BACKGROUND OF THE INVENTION

1. Field of the Invention

The present invention relates to an improvement in an optical device which switches light transmission paths.

2. Prior Arts

One typical example of the conventional light path switching device is constructed as shown in FIG. 1, wherein a first optical fiber 1 is connected to a moving piece 2 of a magnetically responsive material such as iron and second and third optical fibers 5 and 5' are fixed on respective supporting members 4 and 4', which are secured on opposite inner walls of a box 41. A pair of coils 3 and 3' are provided so as to induce a magnetic force at excitation by currents therethrough to drive the moving piece 2 either to the side of the supporting member 4 or to that of the supporting member 4' responding to polarity of the currents. By driving the moving piece 2, the end face of the first optical fiber 1 is put in front of the end face of the second optical fiber 5 or that of the third optical fiber 5', so that light is transmitted from the optical fiber 1 to the optical fiber 5 or to the optical fiber 5'.

The abovementioned conventional light path switch has such shortcomings that the end part of the first optical fiber 1 is liable to damage in a relatively short time due to repeated shocks when driven between the supporting members 4 and 4', that a considerable gap is necessary between the end faces of the first and the second optical fibers 1 and 5 or between those of the first and the third optical fibers 1 and 5', and that it is difficult to construct a light path switch capable of selectively switching among three or more light paths.

Though there is known a light path switching device utilizing a lens system, it is too large and has an excessive loss of light for practical use.

SUMMARY OF THE INVENTION

The present invention provides a simple structured light path switching device with low loss and capable of switching among three or more light paths.

The present invention is an optical device comprising a focussing lens, at least two optical waveguides having their end faces on a focal plane of said focussing lens, a reflection means disposed in an opposite side to said focal plane with respect to said lens, and a means for controllably moving said reflection means such that rays issuing from one of said end faces of the optical waveguide and passing through said lens is reflected to pass through said lens in variable substantially inverse directions, including at least a direction for entering into another one of said end faces.

DESCRIPTION OF PREFERRED EMBODIMENTS

The present invention provides an optical device, wherein, as one example, switching of optical waveguide can be made without moving the optical fiber.

Figure 1:
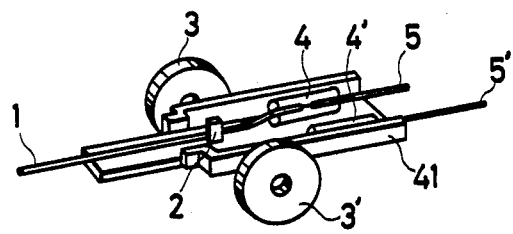
FIG. 1 is a perspective view showing an example of the conventional light path switch.
Figure 2:
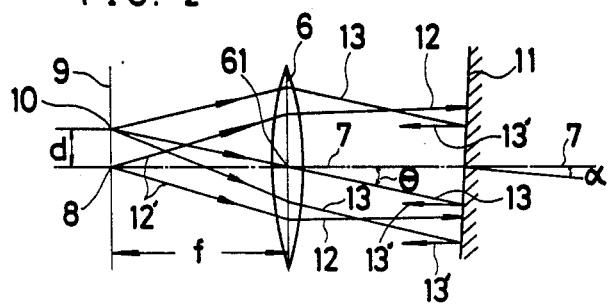
FIG. 2 is a schematic view showing principle of the device in accordance with the present invention.

The principle of operation of the present invention is elucidated with reference to FIG. 2.

On a focal plane 9 of an optical convergence lens 6, a light source point 10 is provided. A reflection means 11 (a plane mirror) is disposed in an opposite side to said focal plane with respect to said lens 6. The normal line of the reflection plane of the reflection means 11 is selected to have a small angle $\alpha°$ to the axis 7 of the lens 6. If rays 12' are emanated from the focal point 8 on the focal plane 9, the rays 12' are converged by the lens 6 to form parallel rays 12. In such optical system, when the line connecting the point 10 and the optical center of lens 61 has an angle $\theta$ to the lens axis 7, rays emanated from the light source 10 and converged by the lens 6 becomes an inclined parallel rays 13 having the angle $\theta$ to the lens axis 7.

Provided that:

d . . . distance between the focal point 8 and the light source point 10.

f . . . focal length of the lens 6 (i.e., the distance between the points 61 and 8), $\tan \theta = (d/f)$ holds.

Then, when a relation $2\alpha = \theta$ holds, then rays, which are emanated from the light source 10 are converged into the parallel rays 13 by means of the lens 6, are reflected by the reflection means 11, thereby forming parallel rays 13' which are parallel to the lens axis 7, and which converge on the focal point 8. By means of known principle of geometric optics, when the light source is disposed at the focal point 8, then the reflected rays converges on the point 10. The distance between the focal point 8 and the point 10 responds to the angle $\alpha$. As a conclusion, rays originated from the focal point 8 and reflected by the tilted reflection means 11 converges on a point on the focal plane 9. This law is utilized in the device of the present invention.

Hereinafter, the present invention is elucidated referring to FIGS. 3(a) to 9 showing several preferred exemplary embodiments.

Figure 3A:
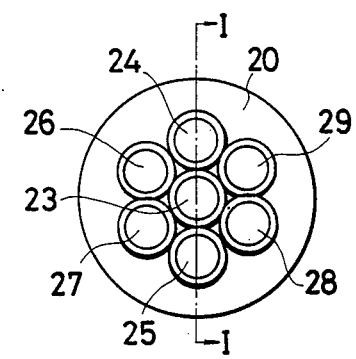
FIG. 3(a) is a front view of an example of device embodying the present invention.
Figure 3B:
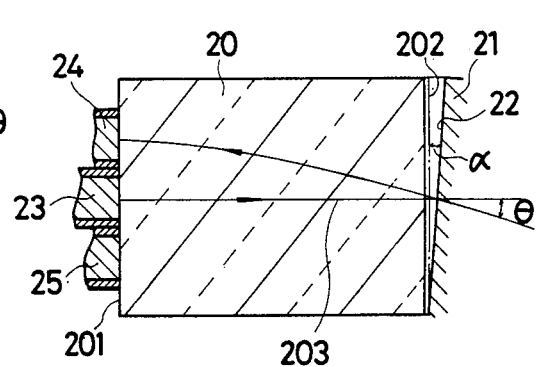
FIG. 3(b) is a sectional side view at the sectional plane I—I of FIG. 3(a).

In FIG. 3(a) and FIG. 3(b) which show a first example, on one end face 201 of a known light focussing rod lens 20 of about ¼ pitch length, are contactingly disposed end faces of seven optical waveguides 23, 24, 25, 26, 27, 28 and 29. The end face of the waveguide 23 in the center position is disposed on the axis of the lens, and the end faces of the other six waveguides are disposed on the equal distance from the lens axis 203. On the other side of the rod lens 20 are disposed a tilted reflection means 21. The normal line of the reflection plane 22 of the reflection means 21 has an angle $\alpha°$ to the lens axis 203. Accordingly, the reflection plane 22 is tilted by $\alpha°$ to the plane 202 which is normal to the lens axis 203. When the angle $\alpha$ is selected to be a specified value, rays coming from the central waveguide 23 into the rod lens 20, reflected by the tilted reflection plane 22 and traveling through the rod lens 20 focuses and enters into the waveguide 24. When the reflection means 21 is turned clockwise by 60° around the lens axis 203, the reflected rays focusses on the end face of the waveguide 29. By further turning the tilted reflection means, the reflected rays can be led to either of six waveguides 24, 25, 26, 27, 28 and 29.

Figure 4:
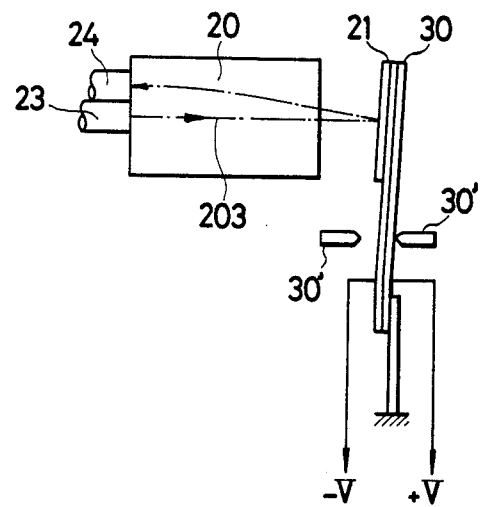
FIG. 4 is a side view of another example in accordance with the present invention.

When optical waveguides with core-diameter, clad-diameter and numerical aperture of 100 μm, 150 μm and 0.28, respectively, are used for the seven waveguides, together with a focussing rod lens 20 having 2 mm diameter and 20.8 mm pitch length, the angle $\alpha$ becomes $\alpha \approx 2.1°$. This is empirically confirmed. Average insertion loss of this example was about 1.0 dB. When a stop motor was used to drive the reflection means, the switching time was about 15 m sec. FIG. 4 shows another example, wherein the tilted reflection means 21 can be quickly driven by means of a piezo-electric driving means 30, so that switching of the optical waveguide can be made very quickly. The piezo-electric driving means 30 has a sandwich type bimorph structure having two layers of piezo-electric substance and electrodes. For each of the piezo-electric substance, 20 mm long and 0.2 mm thick PZT (lead titanium ziroconium oxide ceramic) can be used. A small reflection mirror 21 is bonded on the sandwich structured driving means 30, and a pair of stoppers 30' and 30' are disposed so as to define the right angles of the reflection mirrors 21. Other parts are constructed similarly to those of preceding example. By employing optical waveguides of 120 μm outer diameter and focussing rod lens of 2 mm diameter and 32 mm pitch length, the angle $\alpha$ between the plane normal to the lens axis and the reflection plane of the reflection means 21 is about 1.0°.

By switching the impressed voltage across the electrodes of the piezo-electric driving means from −134 V to +134 V, by applying a step voltage, the driving means is driven by known piezo-electric effect, and changes the angle of the reflection means 21 and switches the optical waveguide. The time period for the switching of the optical waveguide is as short as only 15 m sec.

As an alternative configuration, the driving means 30 can be constituted by utilizing an electromagnet.

By selecting the angle of the reflection means intentionally to be out of the abovementioned theoretical angle, the incident light to the optical waveguide does not fully enter into the waveguide 24, and is partly lost. Accordingly, the device of FIG. 4 works also as a variable attenuator, or an optical modulator.

Figure 5:
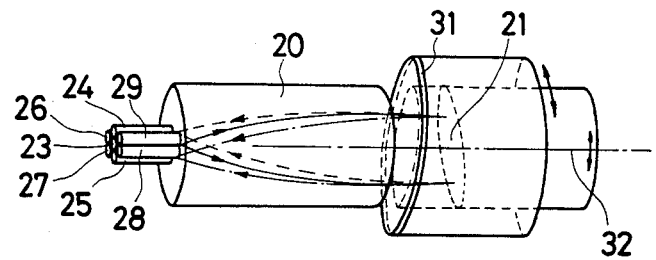
FIG. 5 is a perspective view of another example in accordance with the present invention.

FIG. 5 shows another example comprising a semi-transparent reflection means, for example, a filter 31, which for example reflects light of a wavelength $\lambda_1$ but passes light of another wavelength $\lambda_2$. The filter 31 is disposed in front of the reflection means 21. The filter 31 and the reflection means 21 are tilted by the same angle $\alpha$ to a normal plane to the lens axis. And both the filter 31 and the reflection means 21 are supported so as to be separately rotatable around the lens axis by known means. Other parts are constituted in the same way as the preceding example of FIG. 3(a) and FIG. 3(b).

Provided that two light signals $\lambda_1$, and $\lambda_2$ enter from the central waveguide 23 into the rod lens 20, the incident rays become parallel rays when get out of the other end of the rod lens 20. Then the rays of the wavelength $\lambda_1$ are reflected by the filter 31, while those of the wavelength $\lambda_2$ are reflected by the reflection means 21. Therefore, when the faces of the filter 31 and the reflection means 21 are in the position as shown in FIG. 5, the rays of the wavelength $\lambda_1$ are focussed on the end face of the waveguide 24 and those of $\lambda_2$ on that of 25. Accordingly, by turning the filter 31 and the reflection means 21 separately to a desired position, the rays of $\lambda_1$ and of $\lambda_2$ can be separately led into desired one of the waveguides 24 to 29. As a modification, by using a neutral reflection mirror in place of the filter 31 and by forming the reflection means 21 by a dichroic mirror, dividing the light in formation is also possible.

Figure 6:
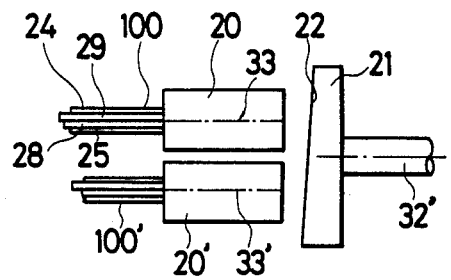
FIG. 6 is a side view of another example in accordance with the present invention.

FIG. 6 shows a further modified example comprising two set of optical switches and is capable of switching the waveguide connection of these switches in an interlocked relation to each other. In FIG. 6, a pair of rod lenses 20 and 20' are disposed with their lens axis in parallelism to each other. On the faces of one end of both of the rod lenses 20 and 20' are connected bunches 100 and 100' of seven optical waveguides. For both rod lenses, a common reflection means 21 (a tilted plane mirror) is disposed with a rotatable supporting means 32'. The axis of the rotation of the reflection means 21 is disposed in parallelism with the axes of the rod lenses 20 and 20'. Other details are constituted in the same manner as those of the example of FIG. 3(a) and FIG. 3(b).

In the device, by turning the reflection means around the shaft of its supporting means 32', the light from the central waveguides of bunches 100 and 100' are reflected by the reflection means 22 and are input to the respective upper waveguides of the bunches 100 and 100'. Therefore, by turning the single reflection means 21, both switches for the bunch 100 and for the bunch 100' can be driven simultaneously in the interlocking relation.

Figures 7A, 7B:
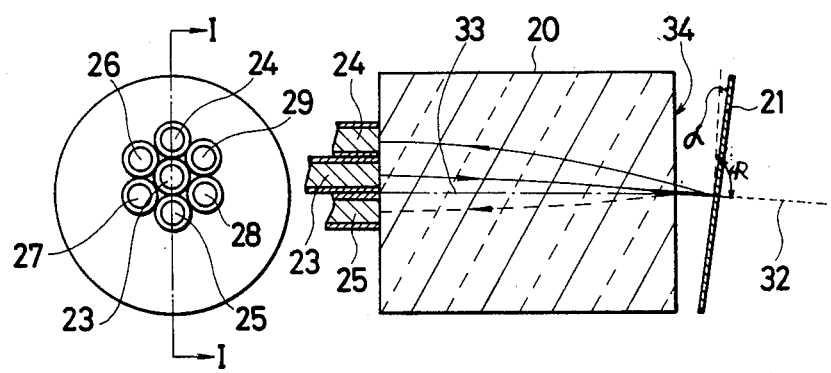
FIG. 7(a) is a front view of an example in accordance with the present invention.
FIG. 7(b) is a sectional side view at the sectional plane I—I of FIG. 7(a).

FIG. 7 shows another example, wherein a means for transmitting a controlling signal is provided in the system. In the device of FIG. 7, the end faces of the central waveguide 23 and that of the lower waveguide 25 are disposed symmetrically with respect to the lens axis 33. The axis of rotation 32 of the supporting means of the reflection means is selected to be parallel to the direction of the output rays which are issued from the central waveguide 23 to the rod lens 20 and put out of the rear end face of the rod lens 20. The reflection plane of the reflection means 21 is tilted by the angle $\alpha$ to the plane normal to the axis of rotation 32. By so constructing, when the reflection means is in the position shown in FIG. 7, the rays issued from the central waveguide 23 are, after reflection by the reflection means 21, put into the upper waveguide 24, while the rays originated from the central waveguide 23 and reflected by the rear end face 34 of the rod lens are put into the lower waveguide 25. When the reflection means 21 is rotated around its axis of rotation 32, the waveguide to which rays originated from the central waveguide 23 are put shifts from 24 to 26, 27, 28 and 29. Of course, the rays from the waveguide 23 are put into the waveguide 25, but this connection is not utilized since the waveguide 25 is already used to transmit the abovementioned partially reflected rays of the central waveguide 23. Irrespective of the position in the rotation of the reflection means, the waveguide 25 receives the abovementioned partially reflected rays of the central waveguide 23. Therefore, by superposing a control light signal for rotating the reflection means 21 on the information light signal to be put in the central waveguide 23, and by picking up the control light signal from the output of the waveguide 25, it is possible to switch the optical device totally by means of the light signals.

Figure 9:
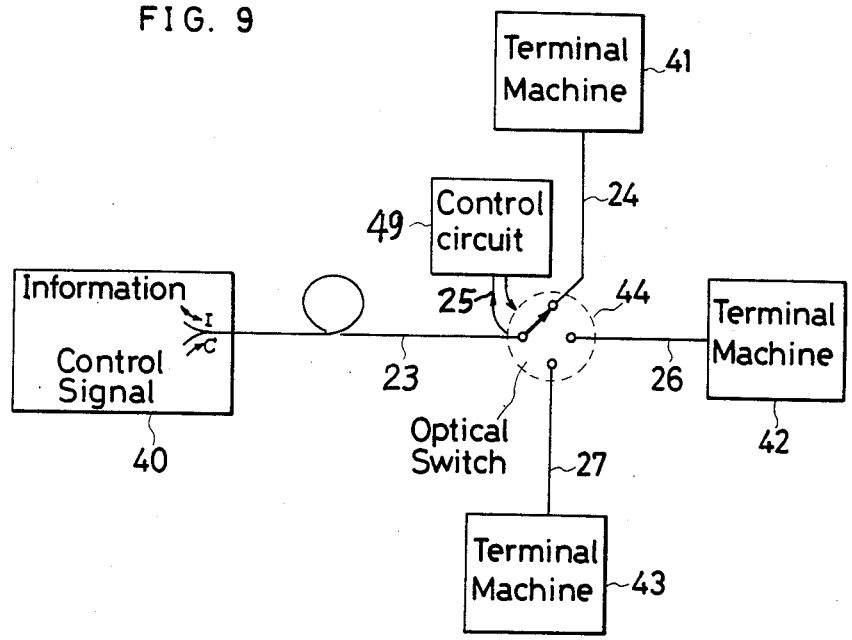
FIG. 9 is a block diagram of the electric circuit of the device of FIG. 7 or FIG. 8.

FIG. 9 shows a switching system utilizing the optical switch 44 in accordance with the examples of FIG. 7. In FIG. 9, a central machine 40 puts information signals I and control signals C into the central waveguide 23 and a partial output divided by the partial reflection is given to a control circuit 49 through the waveguide 25. The control circuit controls the position of the reflection means responding to the control signal given from the central machine 40. By means of the electrical output of the control circuit and by the rotating motion of the known driving means, the reflection means is rotated and thereby switches the optical waveguide to connect the waveguide 23 to a selected one waveguide 24, 26 or 27. By such connection, the terminal machine 41, 42 or 43 and the central machine 40 are connected by the optical waveguides with each other. Accordingly, light signal can be transmitted in either of desired directions, from the central machine to one of the terminal machine or vice versa.

As a modified example, the control light signal can be picked up from a surface of semitransparent reflection means such as a filter which is disposed in a normal plane to the lens axis immediately behind the rod lens 20 and capable of transmitting a specified wavelength and reflecting another specified wavelength used for the controlling signal.

Figure 8:
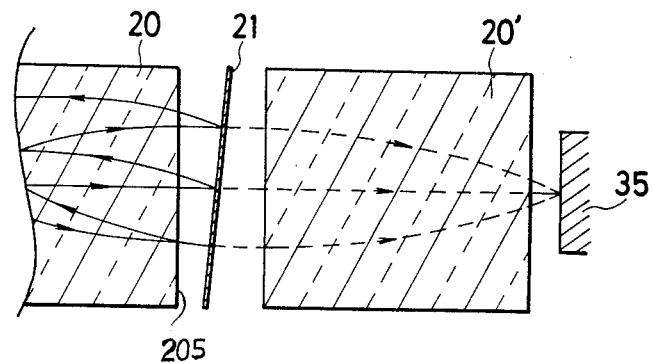
FIG. 8 is a sectional side view of another example in accordance with the present invention.

FIG. 8 shows another example of an optical switch provided with a means for transmitting a controlling signal. On the front end face of a main focussing rod lens 20 are connected end faces of a specified number of optical waveguides (omitted from the drawing) similarly to the examples of FIGS. 3(a) and 3(b) and FIG. 5. Behind the rear face 205 of the main rod lens 20 is provided a tilted half mirror 21, which is tilted to have a specified angle to a plane normal to the lens axis, which partly passes and partly reflects the rays incident thereon. Further behind the half mirror 21, follows an additional focussing rod lens 22 and a photoelectric transducer 35. The rays which passed the half mirror 21 are focussed on the photoelectric transducer 35 by the additional rod lens 20', thereby to produce the control signal for rotating the half mirror 21. The half mirror 21 can be a filter which selectively passes rays of wavelength used as the control signal.

In any of the preceding examples, it is possible to give the transmitted signal a desired degree of attenuation by finely and continuously changing the tilt angle of the reflection means (or mirror) to make the reflected rays focus only partly on the end face of the designated waveguide.

As described above, the optical device in accordance with the present invention has the following advantages: The optical waveguide is permanently connected to the end face of the lens in a satisfactory condition and is not moved for switching, and accordingly the delicate end part of the optical waveguide is free from damage by switching operation and moreover the system has good transmission characteristics. When piezoelectric driving means are used to drive the reflection means, a very high speed switching, and a high speed change of attenuation, can be achieved hence modulation can be made. By adjusting the tilt angle of the reflection means, desired degree of attenuation can be given to the transmission signal. By employing a filter as the reflection means, selective switching for different wavelength signals can be made. By selecting the arragement of the end faces of the optical waveguides on the end face of the rod lens, taking of the control signal out of the information signal in the live transmission waveguide can be made without inserting an undesirable dividing network in the optical waveguide circuit, and without degeneration of the transmission characteristics.

What we claim is:

1. An optical switching device comprising:
    a focussing lens,
    a plurality of optical waveguides having respective end faces disposed on a focal plane of said focussing lens,
    reflection means disposed at an end of said focussing lens furthest from the focal plane thereof for reflecting rays incident thereupon,
    means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, and
    an additional reflection means provided between said focussing lens and said reflection means, said additional reflection means being semi-transparent to reflect certain wavelength rays and transmit certain other wavelength rays, for cooperating with said reflection means to reflect different wavelength rays in respective different directions.

2. An optical switching device comprising:
    a focussing lens,
    a plurality of optical waveguides having respective end faces disposed on a focal plane of said focussing lens,
    reflection means disposed at an end of said focussing lens furthest from the focal plane thereof for reflecting rays incident thereupon,
    means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, and
    an additional reflection means provided on the side of said reflection means opposite said focussing lens, said reflection means being semi-transparent to reflect certain wavelength rays and transmit certain other wavelength rays, for cooperating with said reflection means to reflect different wavelength rays in respective different directions.

3. An optical switching device comprising:
    a first focussing lens,
    a second focussing lens, respective central axes of said first and second focussing lens being parallel to one another,
    a first waveguide set having a plurality of optical waveguides having respective end faces disposed on a focal plane of said first focussing lens, a second waveguide set having a plurality of optical waveguides having respective end faces disposed on a focal plane of said second focussing lens, reflection means disposed at the ends of said first and said second focussing lens furthest from the respective focal planes thereof for reflecting rays incident thereupon issuing from said first focussing lens and said second focussing lens, and means for controllably moving said reflection means, rays issuing from one of the end faces of said first waveguide set and transmitted through said first focussing lens, and rays issuing from one of the end faces of said second waveguide set and transmitted through said second focussing lens, being controllably reflected by said reflection means in respective selected direction, including respective specific directions to enter selectively into at least one respective end face of said first waveguide set other than the end face thereof from which rays issued, and into at least one reflective end face of said second waveguide set other than the end face thereof from which rays issued.

4. An optical switching device comprising:

a focussing lens, a plurality of optical waveguides having respective end faces disposed on a focal plane of said focussing lens, reflection means disposed at an end of said focussing lens furthest from the focal plane thereof for reflecting rays incident thereupon, means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, a control signal optical waveguide disposed for receiving rays reflected by a semi-transparent reflection means having a reflection plane normal to a central axis of said focussing lens, and control means responsive to an output of said control signal optical waveguide for controlling said means for controllably moving said reflection means.

5. An optical switching device comprising:

a focussing lens, a plurality of optical waveguides having respective end faces disposed on a focal plane of said focussing lens, reflection means disposed at an end of said focussing lens furthest from the focal plane thereof, said reflection means being semi-transparent for reflecting certain wavelength rays and for transmitting certain other wavelength rays, means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, means for collecting the rays transmitted through said reflection means, said collecting means being disposed behind said reflection means, and control means, connected to said collecting means and responsive to an output thereof, for controlling said means for controllably moving said reflection means.

6. An optical switching device comprising:

a focussing lens, a plurality of optical waveguides having respective end faces disposed on a focal plane of said focussing lens, reflection means disposed at an end of said focussing lens furtherest from the focal plane thereof for reflecting rays incident thereupon, and means for controllably moving said reflection means, the movement being a rotation about a central axis thereof, rays issuing from one of said end faces and transmitted through said focussing lens being controllably reflected by said reflection means in selected directions, including at least a specified direction to enter selectively into at least one respective end face other than the end face from which said rays issued, wherein an additional reflection means is provided between said focussing lens and said reflection means, said additional reflection means being semi-transparent to reflect certain wavelength rays and transmit certain other wavelength rays, for cooperating with said reflection means to reflect different wavelength rays in respective different directions.

7. An optical device comprising:

a focussing lens, a plurality of optical waveguides having respective end faces disposed on a focal plane of said focussing lens, reflection means having a planar reflective surface tilted relative to a central axis of said focussing lens and being disposed at an end of said focussing lens furthest from the focal plane thereof, for reflecting rays incident thereupon, and means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, wherein an additional reflection means is provided between said focussing lens and said reflection means, said additional reflection means being semi-transparent to reflect certain wavelength rays and transmit certain other wavelength rays, for cooperating with said reflection means to reflect different wavelength rays in respective different directions.

8. An optical switching device comprising:

a focussing lens, a plurality of optical waveguides having respective end faces disposed on a focal plane of said focussing lens, reflection means disposed at an end of said focussing lens furthest from the focal plane thereof for reflecting rays incident thereupon, and means for controllably moving said reflection means, the movement being a recurrent change in an angle of said reflection means relative to a central axis of said focussing lens, rays issuing from one of said end faces and transmitted through said focussing lens being controllably reflected by said reflection means in selected direction, including at least a specified direction to enter selectively into at least one respective end face other than the end face from which said rays issued, wherein an additional reflection means is provided between said focussing lens and said reflection means, said additional reflection means being semi-transparent to reflect certain wavelength rays and transmit certain other wavelength rays, for cooperating with said reflection means to reflect different wavelength rays in respective different directions.

9. An optical switching device comprising:
a focussing lens,
a plurality of optical waveguides having respective end faces disposed on a focal plane of said focussing lens, one of said end faces being centrally disposed relative to the end faces other than said centrally disposed end face, the end faces other than said centrally disposed end face being arranged around said centrally disposed end face with uniform distances therebetween;
reflection means disposed at an end of said focussing lens furthest from the focal plane thereof for reflecting rays incident thereupon, and
means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued,
wherein an additional reflection means is provided between said focussing lens and said reflection means, said additional reflection means being semi-transparent to reflect certain wavelength rays and transmit certain other wavelength rays, for cooperating with said reflection means to reflect different wavelength rays in respective different directions.

10. An optical switching device comprising:
a focussing lens,
a plurality of optical waveguides having respective end faces disposed on a focal plane of said focussing lens,
reflection means disposed at an end of said focussing lens furtherest from the focal plane thereof for reflecting rays incident thereupon, and
means for controllably moving said reflection means, the movement being a rotation about a central axis thereof, rays issuing from one of said end faces and transmitted through said focussing lens being controllably reflected by said reflection means in selected directions, including at least a specified direction to enter selectively into at least one respective end face other than the end face from which said rays issued,
and further comprising:
another focussing lens, and
another plurality of optical waveguides having respective end faces disposed on a focal plane of said another focussing lens, said focussing lens and said another focussing lens having respective central axes parallel to one another, and said reflection means being disposed at an end of said another focussing lens furthest from the focal plane thereof for reflecting rays incident thereupon issuing from both said focussing lens and said another focussing lens.

11. An optical device comprising:
a focussing lens,
a plurality of optical waveguides having respective end faces disposed on a focal plane of said focussing lens,
reflection means having a planar reflective surface tilted relative to a central axis of said focussing lens and being disposed at an end of said focussing lens furthest from the focal plane thereof, for reflecting rays incident thereupon, and
means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued,
and further comprising:
another focussing lens, and
another plurality of optical waveguides having respective end faces disposed on a focal plane of said another focussing lens, said focussing lens and said another focussing lens having respective central axes parallel to one another, and said reflection means being disposed at an end of said another focussing lens furthest from the focal plane thereof for reflecting rays incident thereupon issuing from both said focussing lens and said another focussing lens.

12. An optical switching device comprising:
a focussing lens,
a plurality of optical waveguides having respective end faces disposed on a focal plane of said focussing lens,
reflection means disposed at an end of said focussing lens furthest from the focal plane thereof for reflecting rays incident thereupon, and
means for controllably moving said reflection means, the movement being a recurrent change in an angle of said reflection means relative to a central axis of said focussing lens, rays issuing from one of said end faces and transmitted through said focussing lens being controllably reflected by said reflection means in selected direction, including at least a specified direction to enter selectively into at least one respective end face other than the end face from which said rays issued,
and further comprising:
another focussing lens, and
another plurality of optical waveguides having respective end faces disposed on a focal plane of said another focussing lens, said focussing lens and said another focussing lens having respective central axes parallel to one another, and said reflection means being disposed at an end of said another focussing lens furthest from the focal plane thereof for reflecting rays incident thereupon issuing from both said focussing lens and said another focussing lens.

13. An optical switching device comprising:
a focussing lens,
a plurality of optical waveguides having respective end faces disposed on a focal plane of said focussing lens, one of said end faces being centrally disposed relative to the end faces other than said centrally disposed end face, the end faces other than said centrally disposed end face being arranged around said centrally disposed end face with uniform distances therebetween;

reflection means disposed at an end of said focussing lens furthest from the focal plane thereof for reflecting rays incident thereupon, and means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, and further comprising:

another focussing lens, and another plurality of optical waveguides having respective end faces disposed on a focal plane of said another focussing lens, said focussing lens and said another focussing lens having respective central axes parallel to one another, and said reflection means being disposed at an end of said another focussing lens furthest from the focal plane thereof for reflecting rays incident thereupon issuing from both said focussing lens and said another focussing lens.

14. An optical switching device comprising:

a focussing lens, a plurality of optical waveguides having respective end faces disposed on a focal plane of said focussing lens, reflection means disposed at an end of said focussing lens furtherest from the focal plane thereof for reflecting rays incident thereupon, and means for controllably moving said reflection means, the movement being a rotation about a central axis thereof, rays issuing from one of said end faces and transmitted through said focussing lens being controllably reflected by said reflection means in selected directions, including at least a specified direction to enter selectively into at least one respective end face other than the end face from which said rays issued, wherein an additional reflection means is provided on the side of said reflection means opposite said focussing lens, said reflection means being semi-transparent to reflect certain wavelength rays and to transmit certain other wavelength rays, for cooperating with said reflection means to reflect different wavelength rays in respective different directions.

15. An optical device comprising:

a focussing lens, a plurality of optical waveguides having respective end faces disposed on a focal plane of said focussing lens, reflection means having a planar reflective surface tilted relative to a central axis of said focussing lens and being disposed at an end of said focussing lens furthest from the focal plane thereof, for reflecting rays incident thereupon, and means for controllably moving said reflection means, rays issuing from one of said end faces and transmitted through said focussing lens being controllably reflected by said reflection means in selected directions, including at least one specified direction to enter selectively into at least one respective end face other than the end face from which said rays issued, wherein an additional reflection means is provided on the side of said reflection means opposite said focussing lens, said reflection means being semi-transparent to reflect certain wavelength rays and to transmit certain other wavelength rays, for cooperating with said reflection means to reflect different wavelength rays in respective different directions.

16. An optical switching device comprising:

a focussing lens, a plurality of optical waveguides having respective end faces disposed on a focal plane of said focussing lens, reflection means disposed at an end of said focussing lens furthest from the focal plane thereof for reflecting rays incident thereupon, and means for controllably moving said reflection means, the movement being a recurrent change in an angle of said reflection means relative to a central axis of said focussing lens, rays issuing from one of said end faces and transmitted through said focussing lens being controllably reflected by said reflection means in selected direction, including at least a specified direction to enter selectively into at least one respective end face other than the end face from which said rays issued, wherein an additional reflection means is provided on the side of said reflection means opposite said focussing lens, said reflection means being semi-transparent to reflect certain wavelength rays and to transmit certain other wavelength rays, for cooperating with said reflection means to reflect different wavelength rays in respective different directions.

17. An optical switching device comprising:

a focussing lens, a plurality of optical waveguides having respective end faces disposed on a focal plane of said focussing lens, one of said end faces being centrally disposed relative to the end faces other than said centrally disposed end face, the end faces other than said centrally disposed end face being arranged around said centrally disposed end face with uniform distances therebetween;

reflection means disposed at an end of said focussing lens furthest from the focal plane thereof for reflecting rays incident thereupon, and means for controllably moving said reflection means, rays issuing from one of said end faces and transmitted through said focussing lens being controllably reflected by said reflection means in selected directions, including at least a specified direction to enter selectively into at least one respective end face other than the end face from which said rays issued, wherein an additional reflection means is provided on the side of said reflection means opposite said focussing lens, said reflection means being semi-transparent to reflect certain wavelength rays and to transmit certain other wavelength rays, for cooperating with said reflection means to reflect different wavelength rays in respective different directions.

* * * * *